United States Patent [19]

Nakagawa et al.

[11] Patent Number: 4,497,759
[45] Date of Patent: Feb. 5, 1985

[54] DRAWING OF POLYOXYMETHYLENE USING DIELECTRIC HEATING

[75] Inventors: Koichi Nakagawa, Ibaraki; Osamu Maeda, Seki; Shinzo Yamakawa, Katsuta, all of Japan

[73] Assignee: Nippon Telegraph & Telephone Public Corporation, Musashino, Japan

[21] Appl. No.: 452,862

[22] Filed: Dec. 23, 1982

[30] Foreign Application Priority Data

Dec. 24, 1981 [JP] Japan .............................. 56-208031
Dec. 24, 1981 [JP] Japan .............................. 56-208032
Dec. 13, 1982 [JP] Japan .............................. 57-218152

[51] Int. Cl.³ .............................................. B29C 17/02
[52] U.S. Cl. ................................ 264/26; 264/288.4; 264/290.5
[58] Field of Search .............. 264/25, 26, 288.4, 290.5

[56] References Cited

U.S. PATENT DOCUMENTS 3,364,294 1/1968 Garibian et al. ............... 264/25

Primary Examiner—James Lowe
Attorney, Agent, or Firm—Cushman, Darby & Cushman

[57] ABSTRACT

This invention discloses a continuous process for the production of polymer-polyoxymethylene (POM) having small linear expansion coefficients and high tensile modulus, the process for producing an ultrahigh modulus POM comprising the step of drawing a crystalline polymer continuously under dielectric heating while maintaining the ambient temperature at an elevated temperature by external heating, said ambient temperature being controlled to change from a lower temperature to a higher temperature along the drawing direction of said crystalline polymer with a pre-set temperature gradient.

6 Claims, 6 Drawing Figures

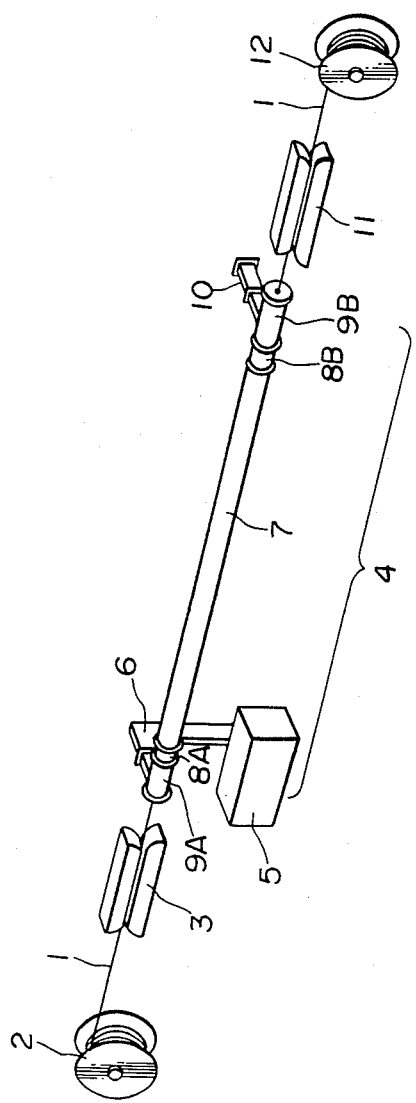

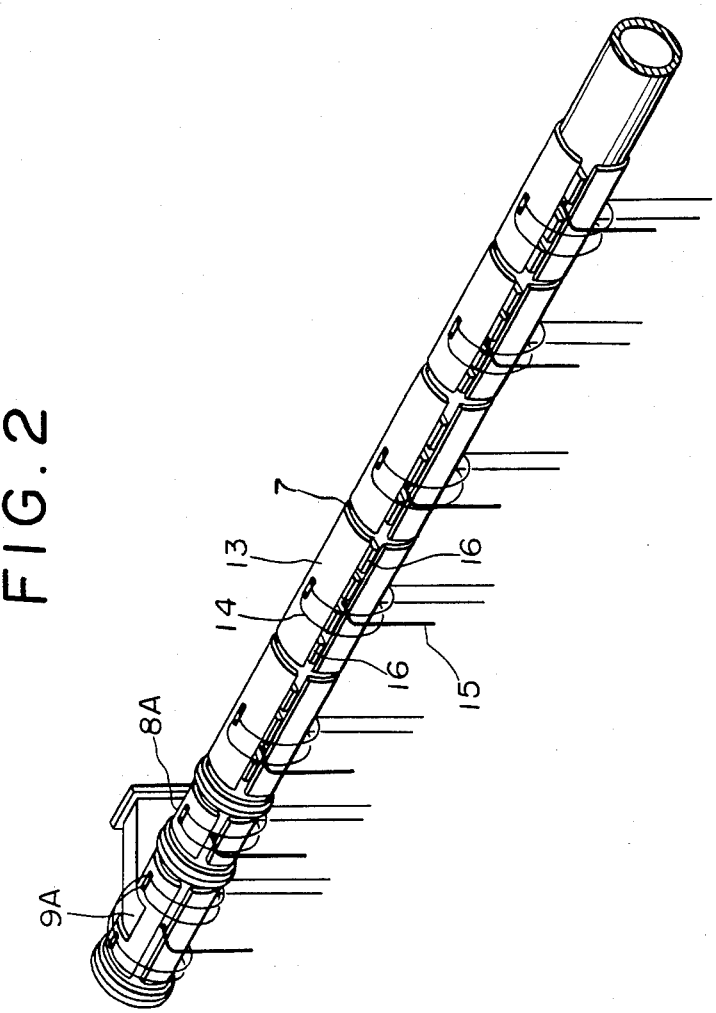

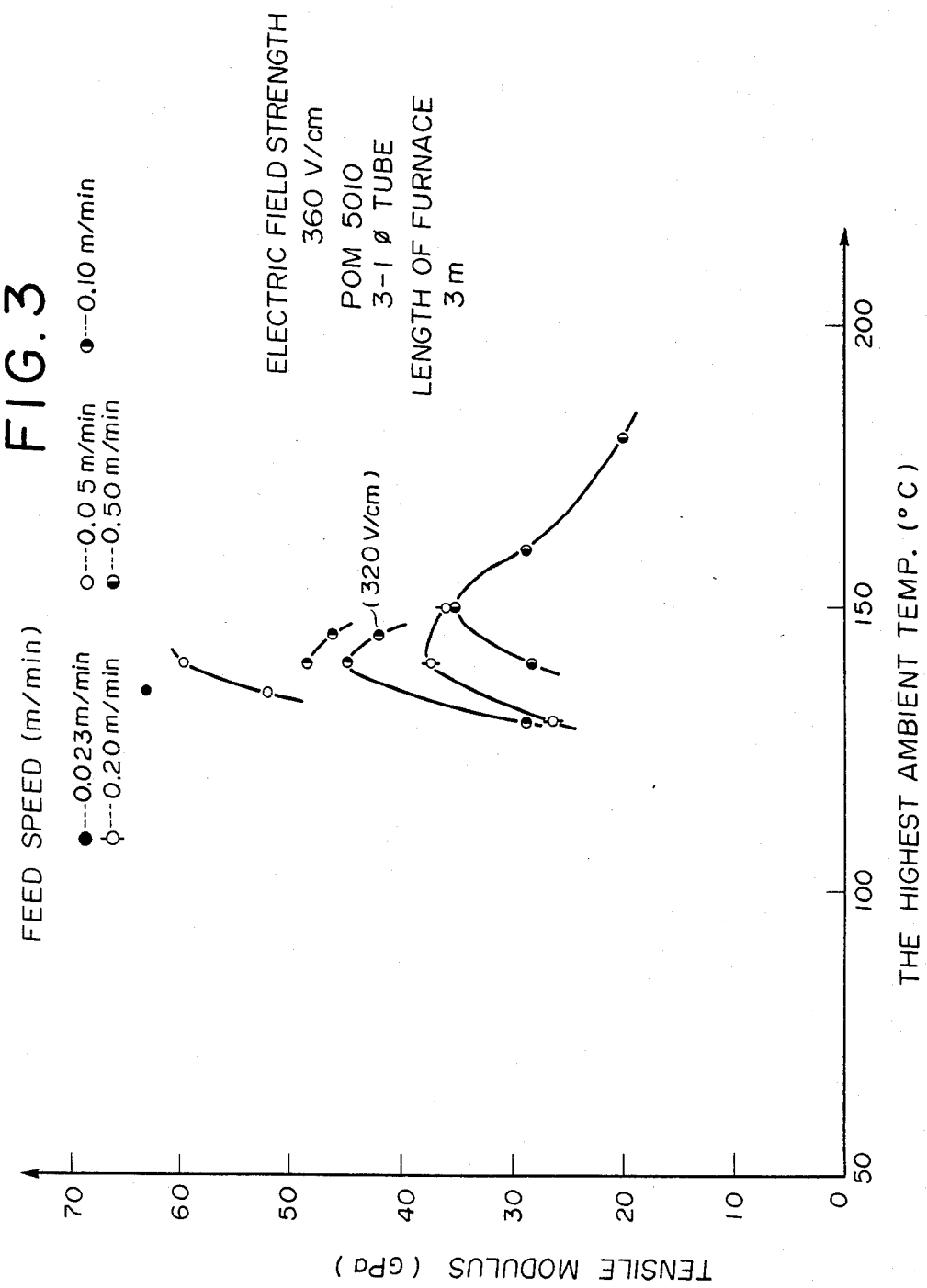

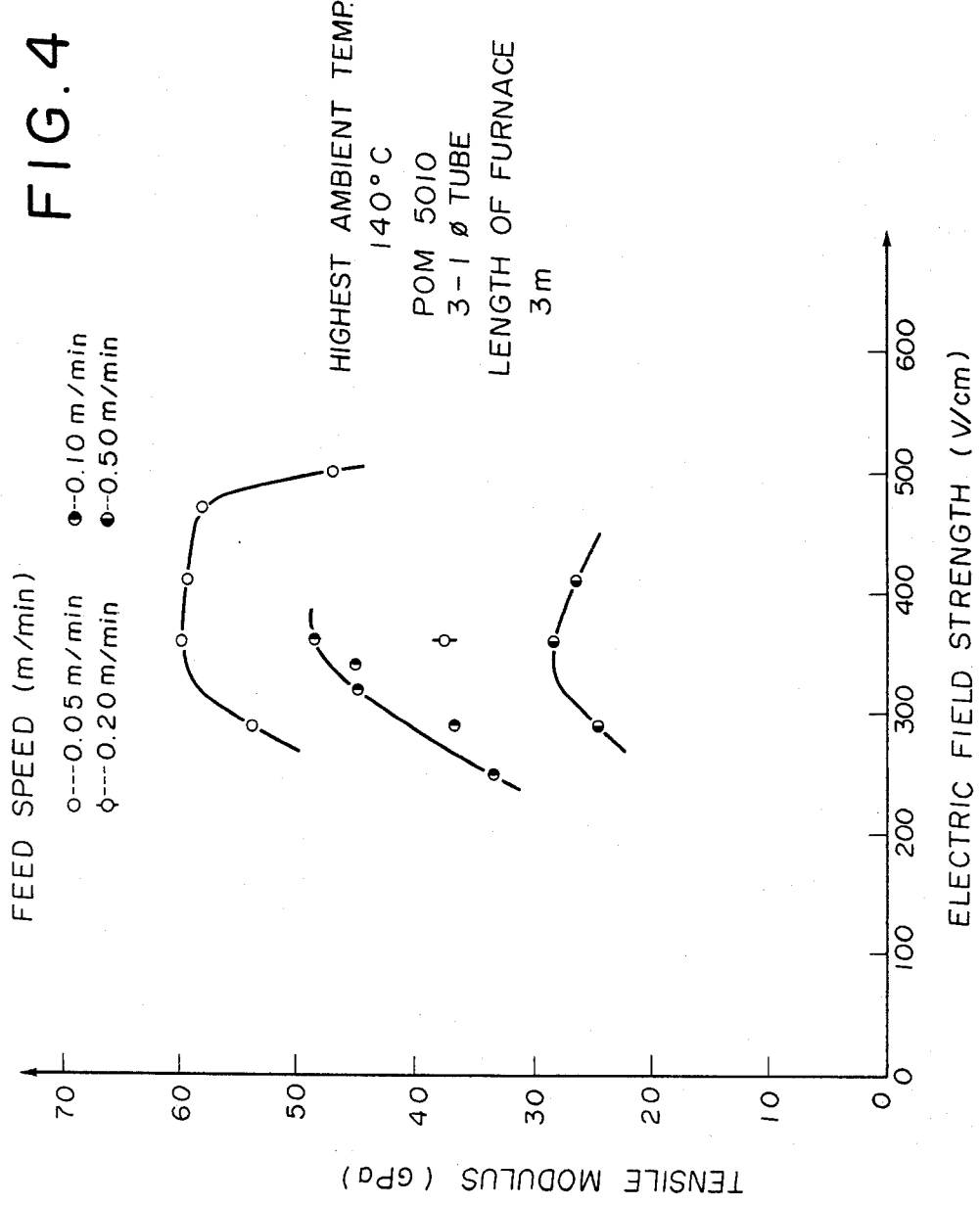

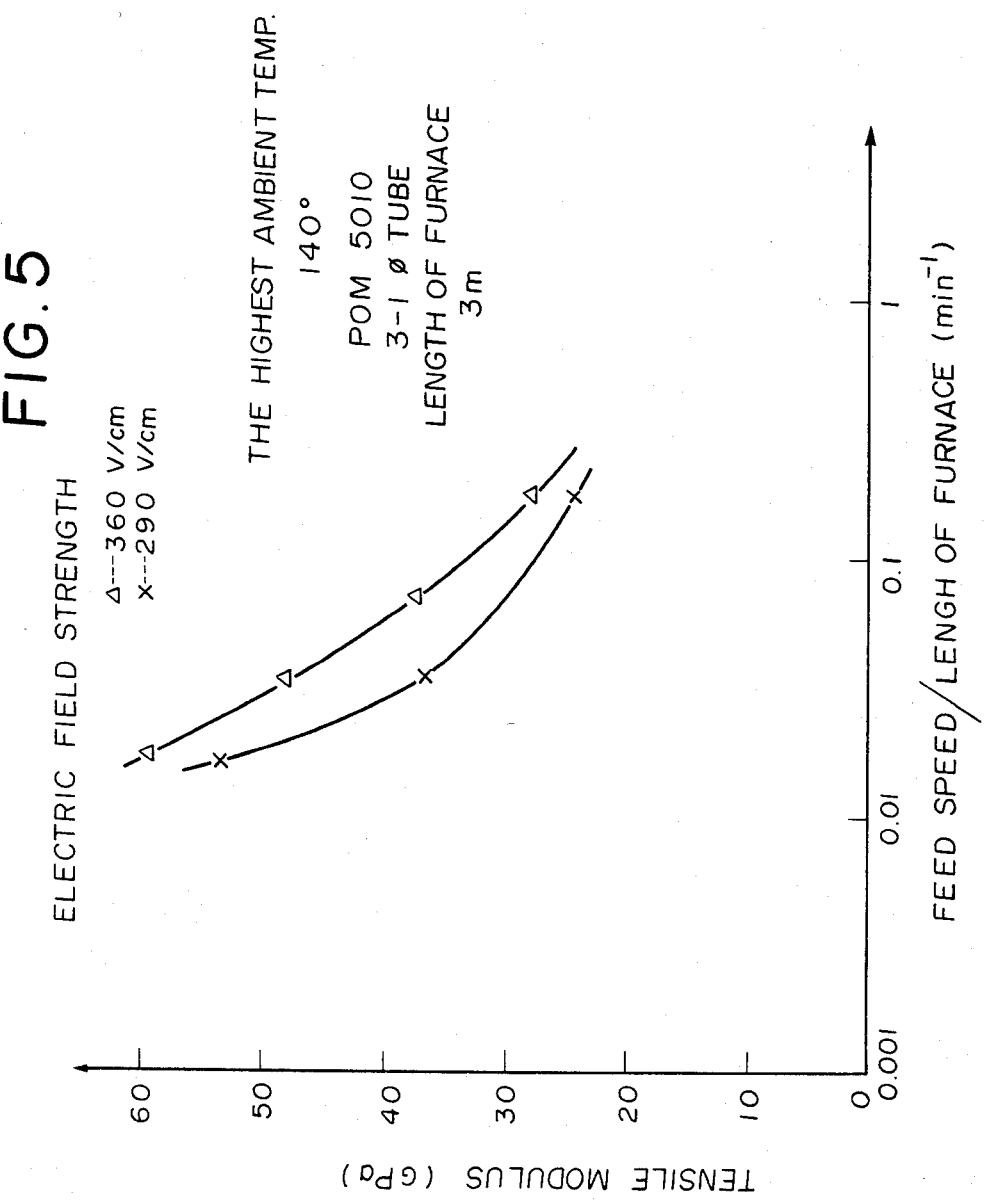

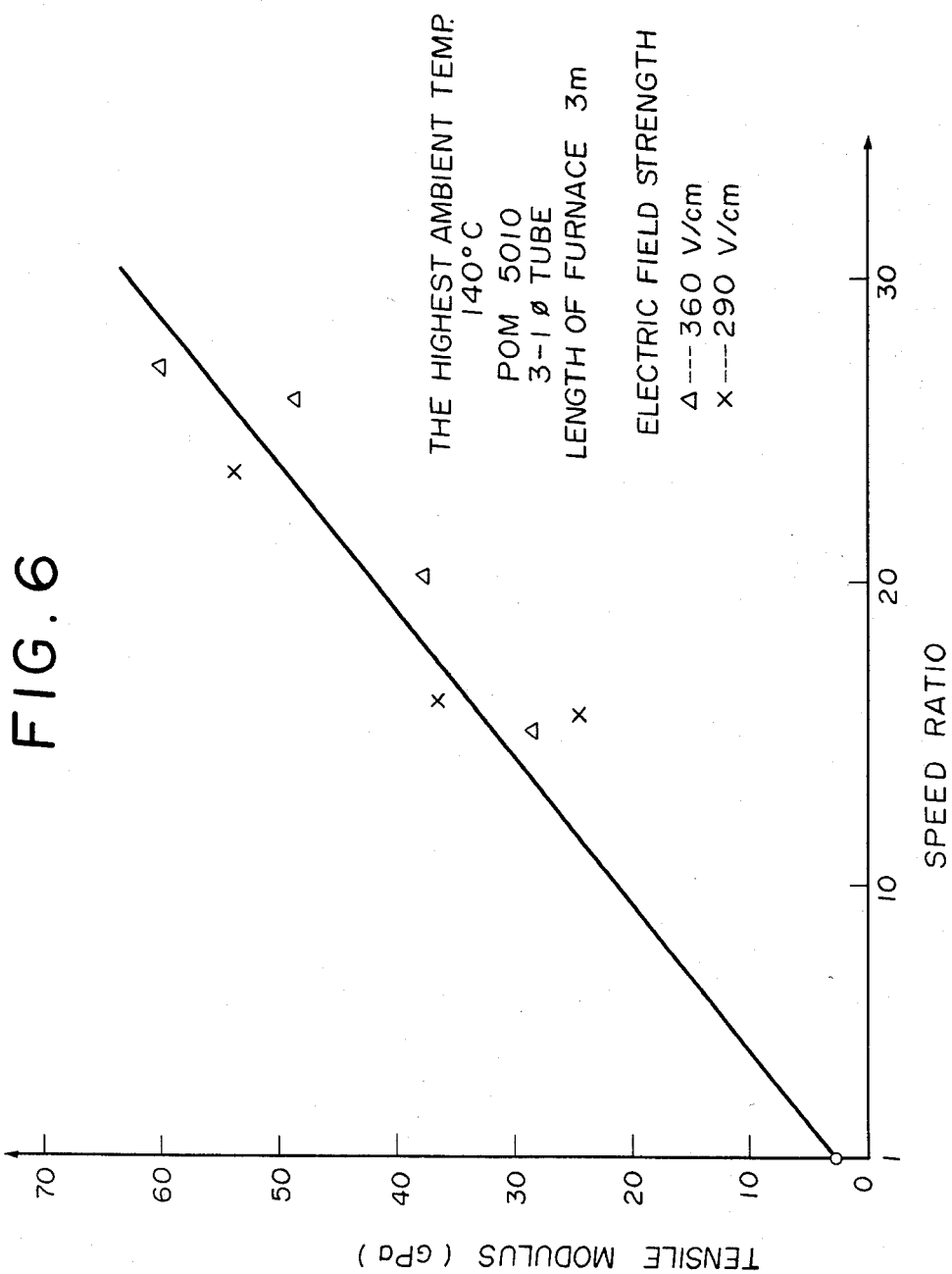

4,497,759

DRAWING OF POLYOXYMETHYLENE USING DIELECTRIC HEATING

BACKGROUND OF THE INVENTION

1. Field of the Invention

This invention relates to a continuous process for the production of polymers having small linear expansion coefficients and high tensile moduli (Young's moduli), and more particularly to a continuous process for the production of a polyoxymethylene (POM) rod or tube having a high tensile modulus.

2. Prior Art

Popular polymeric materials, such as polyethylene, polypropylene, polyoxymethylene, polyesters and nylon, have been frequently processed through hot drawing to obtain ultrahigh-modulus products. A variety of hot drawing processes has hitherto been known in the art, including a process wherein a material is allowed to contact with a hot pin or hot-shoe, a process wherein a material is passed through a hot tube, a process wherein a material is allowed to contact with a rotating hot roller, and a process wherein a hot pin and a hot-shoe are used in combination. However, these known processes have a common disadvantage that these processes can be applied only to process a material in the form of a fiber having a diameter of less than about 0.1 mm or in the form of a film having a thickness of less than about 0.1 mm, since the material is heated from the outside in any of these known processes leading to the result that the inside of the material cannot be heated sufficiently uniformly when the material is processed in the form of a thicker fiber or film. Moreover, the tensile modulus (Young's modulus) of a product polyester fiber processed through any of these known processes is in the order of 20 GPa (Giga Pascals) at the highest.

U.S. Pat. No. 3,364,294 discloses a process for drawing a heavy denier polyester tow (a bundle of filaments) while heating the filaments from the inside thereof by dielectric heating to obtain a product having a tensile modulus of 14 GPa. However, a process for the production of a rod or tube made of an ultrahigh-modulus polymer by drawing the rod or tube under dielectric heating has never been proposed by the prior art references including the preceding United States Patent referred to above.

Recently developed are processes for the direct production of rods or tube having ultrahigh-moduli from any of popular polymer materials. One of the processes recently developed is a so-called hydrostatic extrusion process in which a solid polymer material is forcibly extruded through a tubular die having an inlet of conical shape by the application of hydrostatic pressure. The other of the recently developed processes is a die drawing process in which a solid polymer material is pulled out through a narrow die to be drawn. For example, according to the hydrostatic extrusion process, a POM (polyoxymethylene) rod having a tensile modulus of 24 GPa was produced at a production speed of 0.01 m/min. (Reference should be made to P. D. Coates and I. M. Ward, J. Polym. Sci. Polym. Phys. Ed., 16, 2031 (1978).) On the other hand, according to the die drawing process, a POM rod having a tensile modulus of 23 GPa was produced at a production speed of 0.1 m/min. (Reference should be made to P. S. Hope, A. Richardson and I. M. Ward, J. Appl. Polym. Sci., 26, 2879 (1981).) However, the tensile modulus of a POM rod obtainable by these known processes is lower than 25 GPa. A further and fatal disadvantage common to these known processes is a low production speed which provides an obstacle for the processes to be practically utilized in a commercial scale.

OBJECTS AND SUMMARY OF THE INVENTION

An object of this invention is to provide a process for continuously producing polymer materials having small linear expansion coefficients and high tensile moduli.

Another object of this invention is the provision of a polyoxymethylene rod or tube having a tensile modulus of not lower than 25 GPa.

A further object of this invention is to provide a process for producing an ultrahigh-modulus polymer comprising the step of drawing a crystalline polymer continuously under dielectric heating while maintaining the ambient temperature at an elevated temperature by external heating, said ambient temperature being controlled to change from a lower temperature to a higher temperature along the drawing direction of said crystalline polymer with a pre-set temperature gradient.

According to one aspect of this invention, a crystalline polymer is drawn under dielectric heating in a furnace which is heated from the outside so that the crystalline polymer is drawn under a condition at which the amorphous regions and defect regions within the crystal are heated selectively to a higher temperature than the temperature of the crystalline regions, in other words, under a condition of uneven heating with the crystalline regions heated by heat conduction being not raised to a temperature equal to that of the amorphous regions, whereby the reduction in tensile modulus of the crystalline region during the drawing operation is suppressed and concurrently the drawing stress is effectively applied to the amorphous regions in which the molecular chains are gotten mobile to draw the amorphous regions at a higher draw ratio to facilitate regular orientation of the molecular chains thereby to obtain a product having a small linear expansion coefficient and a high tensile modulus.

According to a more specific embodiment of this invention, there is provided a process for producing an ultrahigh-modulus polymer wherein a rod or tube of polyoxymethylene is drawn under dielectric heating, said process comprising the step of continuously drawing said rod or tube at a highest ambient temperature ranging within 120° to 170° C. and at a feed speed per unit furnace length of not more than 0.3 min.$^{-1}$ while maintaining the product of the oscillation frequency and the square of electric field strength within a range of from $9.8 \times 10$ to $7.4 \times 10^{14}$ Hz·V$^2$/cm$^2$ and maintaining the ratio of the take-up speed to the feed speed at a ratio of not less than 12 times.

BRIEF DESCRIPTION OF THE DRAWINGS

The above and other objects and advantages of this invention will become apparent from the following detailed description with reference to the appended drawings, in which:

FIG. 1 is a perspective view showing diagrammatically an arrangement for dielectric heating which may be used for carrying out the process of the invention;

FIG. 2 is a perspective view showing diagrammatically the heating furnace section of the arrangement shown in FIG. 1;

FIG. 3 is a graph showing the tensile modulus in terms of the highest ambient temperature;

FIG. 4 is a graph showing the tensile modulus in terms of the electric field strength;

FIG. 5 is a graph showing the tensile modulus in terms of the feed speed; and

FIG. 6 is a graph showing the tensile modulus in terms of the ratio of the take-up speed to the feed speed.

DETAILED DESCRIPTION OF THE INVENTION

FIG. 1 shows an embodiment of an arrangement in which a POM (polyoxymethylene) rod or tube 1 is processed through the process of this invention. The arrangement comprises a feed reel 2, a belt catapillar type feeder 3, an apparatus 4 in which the POM rod or tube 1 is subjected to dielectric heating according to the process of this invention, a belt catapillar type take-up machine 11, and a take-up reel 12. The apparatus 4 for effecting dielectric heating includes a circular waveguide 7 for dielectric heating, the circular waveguide 7 being made of copper and having an inner diameter of 95.6 mm and a length of 3 meters, circular waveguides 8A, 8B and 9A, 9B for matching and disposed respectively at the ends of the waveguide 7, a microwave power source 5 and a rectangular waveguide 6 connected to the waveguide 7, the microwave power source 5 generating a microwave of a frequency of 2.45 GHz and having a maximum output of 1.5 kW, the rectangular waveguide 6 being disposed for jointing the microwave power source 5 to the waveguide 7 through the waveguide 9A and 8A to supply microwaves for effecting dielectric heating, and a dummy load 10 for absorbing excess microwave power and connected to the waveguide 9B. The ends of the waveguides 9A and 9B are closed by lid plates, and a hole is provided at the substantial center of each lid plate to pass the POM rod or tube 1 therethrough. The inner diameter of each of the circular waveguides 8A and 8B for matching is somewhat larger than the inner diameter of the waveguide 7 for dielectric heating, and the inner diameter of each of the circular waveguides 9A and 9B for matching it somewhat larger than the inner diameter of each of the circular waveguides 8A and 8B for matching. As a result, the microwave generated from the microwave power source 5 is effectively guided in $TM_{01}$ mode through the rectangular waveguide 6 to the circular waveguide 7 for dielectric heating without being reflected. On the other hand, the excess microwave power is guided through the circular waveguides 8B and 9B for matching to the dummy load 10 for absorption of excess microwave to be absorbed thereby rather than returning back to the power source 5 to injure the same. A circular or rectangular waveguide with comb type electrodes or a ladder type waveguide may be used as the dielectric heating furnace other than the illustrated circular waveguide.

FIG. 2 is a view showing in detail the heating furnace section of the dielectric heating apparatus 4. The heating furnace section comprises band heaters 13, leading wires 14 for supplying electric current to the band heaters 13, thermocouples 15 for measuring the temperature on the walls of the waveguide 7, and observation windows 16 for measuring the ambient temperature in the furnace and for observing the shape of the rod 1 under extension in the waveguide 7. In the illustrated embodiment, six band heaters 13 each having a length of 50 cm are arranged on the outer periphery of the circular waveguide 7 to extend along the drawing direction, and similar band heaters 13 are arranged on the circular waveguides 8A, 8B, 9A and 9B, one for each of them, to cover the outer peripheries thereof. The temperatures on the wall of the waveguide 7 at the positions heated by respective band heaters 13 are monitored by thermocouples 15 to be controlled independently. The ambient temperature inside the furnace may be measured by inserting a temperature measuring device, such as a thermocouple, in the desired position of the furnace through one of the observation windows 16, prior to or after the emission of microwave. With this construction, the dielectric heating furnace may be set to have a desired ambient temperature gradient along the drawing direction.

In operation, the ambient temperature in the heating furnace is set to have a desired temperature gradient, and then a POM rod or tube 1 is fed from the feed reel 2 by the feeder 3 to pass through the dielectric heating furnace 4 where the rod or tube 1 is drawn under dielectric heating and then taken up by the take-up machine 11 to be wound around the take-up reel 12. The rod or tube 1 is dielectrically heated upon energization of the microwave power source 5 and drawn continuously in the circular waveguide 7 under dielectric heating by the action of tension created by the difference between the take-up speed and the feed speed, since the rod or tube 1 is taken up by the take-up machine 11 at a speed far faster than the feed speed of the feeder 3.

When a polymer material is drawn, the crystalline molecular chains are oriented with their molecular axes of crystals extending parallel to the drawing direction and the folded molecular chains are stretched to be reoriented to extend along the drawing direction. This phenomenon is known as the crystalline orientation in the art. At the same time, tension is applied to the molecular chains in the amorphous regions existing between the crystalline regions to orient the molecular chains along the drawing direction. This phenomenon is known as the amorphous orientation in the art. In addition to the crystalline orientation, the amorphous orientation contributes appreciably to the increase in tensile modulus. (In this connection, reference should be made to A. Ciferri and I. M. Ward (Eds.), Ultra-High Modulus Polymers, Appl. Sci. Publishers, 1979.)

It has been known that polymer materials exhibit a variety of dielectric absorptions of relaxation, including the crystalline absorption ($\alpha$-absorption) caused by the motion of molecular chains in the crystalline region, the amorphous absorption ($\beta$-absorption) caused by the motion of main chain in the amorphous region, and the absorption ($\gamma$-absorption) caused by the local motion of the molecular chains in the amorphous region and in the crystal defects. The aforementioned $\alpha$-, $\beta$- and $\gamma$-absorptions are initiated, in this order, as the frequency increases. The temperature and frequency for inducing these absorptions vary depending on the specific kind of the polymer material. In general, the $\alpha$-absorption locates at low frequencies less than 1 Hz, the $\beta$-position is induced by a microwave of 1 kHz to 1 MHz and the $\gamma$-absorption located at high frequencies about 1 GHz at a temperature around room temperature. These absorptions are enhanced and transferred to the higher frequency side, as the temperature becomes higher, and are confused together at the melting point of the polymer material. (Reference should be made to N. G. McCrum, B. E. Read and G. Williams, Anelastic and Dielectric Effects in Polymeric Solids, John Wiley &

Sons, 1967.) These absorptions are excited by loading the polymer material with alternating current fields corresponding to the frequencies inducing respective absorptions to provide heat sources for dielectric heating. It becomes, therefore, difficult to excite a desired absorption at the vicinity of the melting point of the polymer material. However, by maintaining the temperature below the melting point and by selectively controlling the frequency of the applied electric field, the β-absorption and/or the γ-absorption may be selectively excited to heat the amorphous regions and defect regions within the crystal selectively while leaving the crystalline regions to be heated at a lesser extent. The crystalline regions are heated due to heat conduction, as a matter of course. The microwave frequency for industrial use ranges within 13 MHz to 18 GHz, and the amorphous regions and defect regions with the crystal are selectively heated by a microwave having a frequency within this range.

At the initial stage, the amorphous regions and defect regions within the crystal of the POM rod or tube are heated by dielectric heating in the dielectric heating furnace. Since the calorific value of the heat generated at the amorphous regions and defect regions with the crystal of the precursor rod or tube is large enough for heating the entire mass of the processed material, the tension applied on the rod or pipe causes necking to draw the rod or tube. Thereafter, the rod or pipe is continuously drawn in the dielectric heating furnace so that the volume of the amorphous regions and defect regions with in the crystal is gradually decreased to reduce the calorific value of the heat generated by dielectric heating with the increase in heat emission from the surface of the slenderized rod or tube. As a result, the temperature of the processed material is lowered to make it difficult to rearrange the crystalline orientation. However, according to this invention, the ambient temperature distribution in the furnace is controlled such that the ambient temperature raises from a lower temperature to a higher temperature gradually along the drawing direction with a pre-set temperature gradient to suppress excessive heat emission in the course of drawing process, whereby the crystals contained in the processed material are continuously and effectively rearranged to improve the crystalline orientation. Moreover, reduction in tensile modulus due to excessive heating of the crystalline regions can be suppressed because of the fact that the amorphous regions and defect regions within the crystal are selectively heated more intensely than the crystalline region by means of dielectric heating. Furthermore, since the molecular chains in the amorphous region become mobile by dielectric heating, the drawing stress acts effectively upon the amorphous regions and defect regions with in the crystal resulting in effective amorphous orientation. As will be apparent from the foregoing, a POM rod or tube is provided with ultrahigh orientation to have high tensile modulus while being produced through a continuous process. The precursor material must be processed under critical conditions for producing a product provided with such an ultrahigh orientation. After eager pursuits, we have found that the critical parameters for obtaining an ultrahigh-modulus material, such as a POM rod or tube, by drawing under dielectric heating are the ambient temperature, the electric field strength, the feed speed and the speed ratio between the feed speed and the take-up speed. In view of the aforementioned finding, we have continued our investigations to know the ranges of these parameters as defined in the appended claim for producing continuously an ultrahigh-modulus polymer material, such as ultrahigh-modulus polyoxymethylene, having a tensile modulus of not less than 25 GHz which is far higher than the value obtainable by the prior art technique.

As has been described hereinbefore, at the initial stage at which the precursor material to be processed includes the amorphous regions and defect regions within the crystal in a larger volume ratio, the crystalline regions are heated by heat conduction from the amorphous regions which have been selectively heated by dielectric heating. If the calorific value of the heat generated at the amorphous regions and defect regions within the crystal are excessively large, the crystalline regions are heated too rapidly to be reduced in tensile modulus so that the drawing stress developed in the amorphous regions and defects regions with in the crystal becomes insufficient for orienting the amorphous chains and defect chains satisfactorily to attain improved amorphous orientation. For example, if any of the ambient temperature, the applied electric field strength or the content of water or other polar molecular additives is too high, the calorific value of the heat generated in the amorphous regions and defect regions within the crystal becomes excessive resulting in failure in effecting highly oriented rearrangement. For this reason, at the initial stage of drawing the precursor material, it is desirous that the ambient temperature be low enough for selectively heating the amorphous regions and defect regions within the crystal more intensive than the heating of the crystalline regions. Although the crystalline regions are not heated directly by dielectric heating, the crystalline are must be heated by heat conduction at some extent so that the folded molecular chains in the crystals are reoriented to extend straight along the drawing direction by crystalline orientation. The temperature in the processed material is lowered to hinder the reorientation of crystals, as the drawing process proceeds with decrease of the amorphous regions and defect regions within the crystal with attendant reduction in heat generated by dielectric heating and with decrease in diameter with attendant increase of heat emission from the surface of the slenderized rod or tube. It is thus desirous that the ambient temperature in the dielectric heating furnace is gradually raised from a lower temperature to a higher temperature along the drawing direction in order to facilitate reorientation of crystals. The results of the experiments conducted by using a tube having an outer diameter of 3 mm and an inner diameter of 1 mm and by using a rod having a diameter of 2.4 mm both being made of a polyoxymethylene having a number average molecular weight of 37,000, a weight average molecular weight of 83,000, a density of 1.42 g/cm$^3$ and a melting point of 179° C., revealed that the tensile moduli of more than 25 GPa, which are higher than the tensile modulus obtainable by the conventional processes, could be obtained by controlling the highest ambient temperature within the range of from 120° to 170° C. This temperature range corresponds to the range of crystalline relaxation temperature at which the molecular chains of polyoxymethylene in crystals become mobile. It should be appreciated hereby that the highest ambient temperature should be set at a temperature within the temperature range allowing the crystalline orientation. If the highest ambient temperature is set to a temperature lower than 120° C., the tensile modulus of the finished product becomes lower than 25 GPa since the reorientation of crystals is insufficient. On the contrary, if the material is heated approximately to the melting point thereof, for instance, heated to 170° C. for the case of polyoxymethylene, selective heat generation in the amorphous regions and defect regions within the crystal by dielectric heating cannot be attained and the entire mass is brought to a flow drawing state, leading to unsatisfactory tensile modulus of the resultant product.

FIG. 3 shows the changes in tensile modulus of the products obtained by using an embodiment of the apparatus for operating the process of this invention. A polyoxymethylene tube having an outer diameter of 3 mm and an inner diameter of 1 mm was drawn under an electric field strength of 360 V/cm and at a feed speed of 0.023 m/min, 0.05 m/min., 0.10 m/min., 0.20 m/min or 0.50 m/min. while changing the highest ambient temperature. As will be apparent from the curves plotting the measured values, the tensile modulus of the resultant product changes depending on the highest ambient temperature.

In addition to the dependency to the highest ambient temperature, the tensile modulus of the resultant product obtained by drawing under dielectric heating also depends on the calorific value of the heat generated by dielectric heating, and the calorific value depends, in turn, on the electric field strength. A product having a tensile modulus of higher than 25 GPa, which is higher than the maximum value obtainable by the conventional processes, may be produced according to the process of this invention by setting the electric field strength within the range of from 200 to 550 V/cm. Since the electric field strength in the dielectric heating furnace could not be measured directly, it was calculated from the output of the microwave power source using the following equation which is generally applicable in the case of copper made circular waveguide:

$$E = 100 P^{\frac{1}{2}} \left\{ 0.265 \times \left( \frac{2.61 R}{\lambda} \right)^2 \cdot \frac{R^2}{240} \cdot \left[ 1 - \left( \frac{\lambda}{2.61 R} \right)^2 \right]^{\frac{1}{2}} \right\}^{-\frac{1}{2}}$$

wherein E is the electric field strength (V/cm), P is the output (W), R is the radius (m) of the circular waveguide and $\lambda$ is the wave length (m).

For example, when a microwave power source generating a microwave of 2.45 GHz in frequency and a circular waveguide having a diameter of 95.6 mm are used, the following equation is obtained, $$E = 13.46 P^{\frac{1}{2}}$$

For example, an electric field strength of 430 V/cm is developed by applying an output of 1 kW. The calorific value by dielectric heating must be equalized when a microwave power source generating a different frequency microwave is used. The calorific value by dielectric heating is in proportion to the product of the frequency and the square of electric field strength, and the pertinent range may be defined, as recited in the appended claim, within $9.8 \times 10^{13}$ to $7.4 \times 10^{14}$ Hz·V$^2$/cm$^2$, when represented by the product of the frequency and the square of electric field strength. If the calorific value by dielectric heating is less than the range defined as above, selective heating of the amorphous regions and defect regions within the crystal cannot reach the level sufficient for obtaining a product having satisfactory ultrahigh-modulus, and the tensile modulus of the resultant product is lowered to the level which has been obtainable by the conventional hot drawing process. On the contrary, if the calorific value by dielectric heating is in excess of the range defined above, selective heat generation in the amorphous regions and defect regions within the crystal by dielectric heating cannot be attained and the entire mass is brought to have a temperature approximate to the melting point at which the mass is in the flow drawing state due to excessive heat generation. If the calorific value by dielectric heating is increased further, runaway heating inherent to the dielectric heating occurs to cause melting break to make it impossible to obtain a product having high tensile modulus.

As shown in FIG. 4, the tensile modulus changes depending on the electric field strength. The curves illustrated in FIG. 4 were obtained by plotting the tensile moduli measured while setting the highest ambient temperature to 140° C. and setting the feed speed (m/min) respectively to 0.05, 0.10, 0.20 and 0.50.

In the course of drawing a polymer material, the molecular chains tend to extend along the drawing direction under the action of drawing stress. This phenomenon or tendency is referred to as reorientation, and a certain time period is required for reorientation. In case where the strain rate which is defined as the amount of strain per a unit time is too high, the molecular chains cannot be reoriented to result in the break of the material. In order to ovbiate such a break, the polymer material should be drawn under a condition at which the strain rate is as low as possible. The strain rate is the quatinent of the speed difference between the take-up speed and the feed speed divided by the length of the furnace. In order to obtain a polymer product having an ultrahigh-modulus, it is essential to draw the polymer at a high draw ratio by increasing the ratio of the take-up speed relative to the feed speed as large as possible. Interrelation between the aforementioned parameters may be represented by the following equation:

$$\gamma = \frac{V - v}{L} = \frac{v}{L} (\lambda - 1);$$

wherein $\gamma$ is the strain rate, V is the take-up speed, v is the feed speed, L is the length of the furnace and $\gamma$ is the draw ratio.

In order to obtain a product having an ultrahigh-modulus, $\lambda$ should take a larger value and $\gamma$ should take a smaller value, and hence the feed speed per a unit furnace length (v/L should be set to take a small value. Empirical studies conducted by us reveals that a polymer product having a tensile modulus of not less than 25 GPa which is beyond the tensile modulus obtainable by the conventional technology can be produced, in accordance with this invention, by setting the feed speed per a unit furnace length to not higher than 0.3 min.$^{-1}$ and by controlling the speed ratio of the take-up speed to the feed speed at a ratio of not less than twelve times. The tensile modulus of the product depends on the feed speed, as shown in FIG. 5; and the tensile modulus of the product also depends on the speed ratio of the take-up speed relative to the feed speed, as shown in FIG. 6.

Crystalline polymers which may be conveniently drawn in accordance with the process of this invention include polymers having intramolecular polar groups and capable of being heated by dielectric heating, specific examples being polyethers such as polyoxymethylene and polyethyleneoxide, various types of polyamides such as nylon, polyesters such as polyethyleneterephthalate and polybutyleneterephthalate, and vinyl polymers such as polyvinylalcohol and polyvinylidenefluoride. Polyolefins, such as polyethylene and polypropylene, which cannot be heated by dielectric heating inherently due to the lack of polar groups, may be processed through the process of this invention by selectively dispersing polar molecules of water or ethyleneglycol or the like into the amorphous regions and defect regions within the crystal of the polyolefins prior to subjected to dielectric heating.

The aforementioned crystalline polymers may be processed through the process of this invention in the form of filament, rod, tube or tape.

EXAMPLES OF THE INVENTION

The present invention will now be described in detail by referring to presently preferred examples thereof. However, it should be noted here that the invention should not be limited only to the following examples.

EXAMPLE 1

A polyoxymethylene rod (hereinafter referred to as POM rod) 1 was prepared from a polyoxymethylene having a number average molecular weight of not more than 50,000, a density of 1.42 g/cm$^3$ and a melting point of 179° C., and the POM rod 1 was drawn under dielectric heating in the aforementioned dielectric heating apparatus 4 while heating the waveguide 7 externally from the outside of the furnace well. The untreated POM rod had a diameter of 1 mm. The POM rod 1 was fed into the dielectric heating apparatus 4 (frequency: 2.45 GHz, maximum output: 1.5 kW, circular waveguide waveguide length for heating: 0.5 m, inner diameter: 95.6 mm) and drawn therein while maintaining the ambient temperature at 149° C. by external heating and setting the take-up speed by the take-up machine 11 to 1.0 m/min. The feed speed determined by the feeder 3 was gradually lowered, as the output from the microwave power source 5 was increased, to increase the draw ratio. After the output of the microwave oscillator reached the maximum output of 1.5 kW, the feed speed was further lowered at the maximum output to increase the draw ratio until the POM rod 1 was broken. The conditions for and the results of the experiments are shown in Table 1. As will be readily understood by referring to the results shown in Table 1, polyoxymethylene filaments each having a draw ratio of more than 20 and a tensile modulus of more than 30 GPa can be produced easily in accordance with this example.

TABLE 1

| Run No. | 1 | 2 | 3 |
|---|---|---|---|
| Number Average Molecular Weight | 42,000 | 37,000 | 32,000 |
| Weight Average Molecular Weight | 101,000 | 83,000 | 72,000 |
| Feed Speed (cm/min) | 4.8 | 4.1 | 3.9 |
| Draw Ratio | 21 | 25 | 26 |
| Filament Diameter (mmφ) | 0.22 | 0.20 | 0.20 |

TABLE 1-continued

| Run No. | 1 | 2 | 3 |
|---|---|---|---|
| Tensile Modulus (GPa) | 31 | 36 | 34 |

REFERENCE EXAMPLE 1

In this reference example, a polyoxymethylene having a number average molecular weight of 58,000, a density of 1.42 g/cm$^3$ and a melting point of 179° C. was used as the material for a precursor rod 1 to be drawn under dielectric heating additionally by heating the furnace externally. The precursor rod 1 having a diameter of 1.0 mm was fed into the dielectric heating apparatus 4, similar to Example 1 while maintaining the ambient temperature at 149° C. and setting the take-up speed at 10 m/min. The feed speed was lowered as the output of the microwave power source was increased gradually. After the output of the power source reached the maximum output of 1.5 kW, the feed speed was further lowered to increase the draw ratio until the rod 1 was broken. The conditions for the experiment and the results obtained thereby are shown in Table 2. As will be apparent from Table 2, the polyoxymethylene filament produced by this reference example and inferior characteristics such that the draw ratio was less than 15 and the tensile modulus was less than 20 GPa.

TABLE 2

| Run No. | 4 |
|---|---|
| Number Average Molecular Weight | 58,000 |
| Weight Average Molecular Weight | 130,000 |
| Feed Speed (cm/min) | 8.1 |
| Draw Ratio | 13 |
| Filament Diameter (mmφ) | 0.29 |
| Tensile Modulus (GPa) | 18 |

As will be seen by comparing the results of Example 1 with the results of Comparative Example, a polyoxymethylene filament having a higher tensile modulus can be continuously produced, according to the process of this invention, by using a polyoxymethylene having a number average molecular weight of not more than 50,000 as the material for the precursor rod which is subjected to drawing under dielectric heating while heating externally from the outside of the dielectric heating furnace to selectively heat the amorphous regions and defect regions within the crystal of the polyoxymethylene more intensive than the crystalline region thereof.

EXAMPLE 2

As the material for the crystalline polymer rod 1, used was a polyoxymethylene having a density of 1.42 g/cm$^3$, a melting point of 179° C., a number average molecular weight of 37,000 and a weight average molecular weight of 83,000. A precursor rod 1 made of the aforementioned polyoxymethylene and having a diameter of 2.0 mm was fed into a dielectric heating apparatus 4 (frequency: 2.45 GHz, Maximum Output: 1.5 kW, circular waveguide length for heating: 3 m, inner diameter: 95.6 mm). The drawing operation was initiated under the conditions that the ambient temperature was maintained at 147° C. by external heating, that the feed speed by the feeder 3 was set to 43 cm/min., that the output from the microwave power source 5 was 0.06 kW and that the take-up speed was 3.0 m/min. The draw ratio was gradually increased by increasing the take-up speed as the output from the power source was increased. Finally, the rod 1 was drawn at an output of the power source of 0.23 kW and at a take-up speed of 8.1 m/min., whereby the draw ratio of the product reached nineteen times. The take-up speed could not be increased higher tha 8.1 m/min., because the rod 1 was broken at a take-up speed higher than that speed. The resultant filament had a diameter of 0.46 mm. The linear expansion coefficient of the material was remarkedly lowered from $8.1 \times 10^{-5}$ (°C.$^{-1}$) of the precursor rod to $\pm 0.1 \times 10^{-5}$ (°C.$^{-1}$) of the resultant filament, and the tensile modulus of the material was increased from 3 GPa of the precursor rod to 25 GPa of the resultant filament.

REFERENCE EXAMPLE 2

The same material as used in Example 2 was drawn in the same apparatus while following to similar procedure as in Example 2 except in that the precursor rod was drawn only under dielectric heating without heating the furnace by external heating. Similar to Example 2, the drawing operation was initiated while setting the feed speed to 43 cm/min., and the take-up speed was gradually increased as the output of the power source was increased to increase the draw ratio. Although the output of the power source was increased to reach finally 0.40 kW, the take-up speed could not be increased beyond 4.7 m/min so that the highest draw ratio attained by this Reference Example was limited to eleven times. The filament produced by this Reference Example had a diameter of 0.60 mm, a linear expansion coefficient of $2.5 \times 10^{-5}$ (°C.$^{-1}$) and a tensile modulus of 10 GPa.

As will be understood from the foregoing, if the precursor material is heated only by dielectric heating, reorientation of the molecular chains in crystals in the crystalline regions becomes unsatisfactory, since the crystalline regions are not directly heated by dielectric heating, resulting in failure in production of a product having an ultrahigh-modulus value. It has been known in the art that the molecular chains in crystals becomes mobile when polyoxymethylene is heated above 100° C. Accordingly, by raising the ambient temperature in the furnace to a temperature of higher than 100° C., as in Example 2, the crystalline regions are heated by the external heating to facilitate reorientation of the molecular chains contained in the crystalline region, whereby a product having ultrahigh-modulus can be obtained.

EXAMPLE 3

In this Example, it will be described that the ultrahigh-modulus characteristics of the product may be further improved by drawing the material under dielectric heating while heating the dielectric heating furnace from the outside thereof such that the ambient temperature developed in the furnace is gradually raised from a lower temperature to a higher temperature along the drawing direction with an even temperature gradient. In this Example, the ambient temperature in the vicinity of the inlet of the circular waveguide 5 for dielectric heating (waveguide length: 3 m, inner diameter of the waveguide: 95.6 mm) was set to 60° C., and the ambient temperature was gradually raised with an even temperature gradient along the drawing direction so that the ambient temperature reached to the highest temperature of 142° C. in the vicinity of the outlet of the circular waveguide 7. The used precursor rod was the same as used in the preceding Example 2, the rod having a diameter of 2.0 mm and being made of the same polyoxymethylene. The rod was fed into the circular waveguide 7 at a feed speed of 10 cm/min, and the draw ratio was gradually increased by increasing the take-up speed by the take-up machine 11 as the output (frequency: 2.45 GHz) from the microwave power source 5 was increased. As the result, the rod could be drawn to reach a draw ratio of 25 times under the condition at which the output from the power source 5 was increased to 1.0 kW and the take-up speed was increased to 2.5 m/min. The resultant filament had a diameter of 0.40 mm, and the linear expansion coefficient thereof took a negative small value of $-4.0 \times 10^{-6}$ (°C.$^{-1}$). The tensile modulus of the filament was 34 GPa.

The same precursor rod was separately drawn under dielectric heating in the same circular waveguide 7 generally following to the procedures as described above, except in that the ambient temperature in the waveguide 7 is maintained, by external heating, at 146° C. throughout the entire length of the waveguide 7 rather than changing the ambient temperature from 60° C. to 142° C. along a moderate temperature gradient. Similar to the procedures as described above, the feed speed was set to 10 cm/min., and the draw ratio of the rod was increased slowly by increasing the take-up speed with gradual increase in output from the power source 5. However, in this case where the ambient temperature in the waveguide 7 was set to the same temperature throughout the entire length, the take-up speed could not been increased beyond 1.9 m/min at the output from the power source of 1.0 kW so that the maximum attainable draw ratio was nineteen times. The resultant filament had a diameter of 0.46 mm, a linear expansion coefficient of less than $\pm 0.1 \times 10^{-5}$ (°C.$^{-1}$) and a tensile modulus of 25 PGa.

As has been described hereinbefore, in the process for producing an ultrahigh-modulus polymer according to this invention, it is essential to heat the dielectric heating furnace or waveguide from the outside thereof in addition to dielectric heating. More specifically, it is essential that the polymer is processed under the condition at which the amorphous regions and defect regions within the crystal of the polymer sample is selectively heated more intensely by dielectric heating than the crystalline region while heating the entire mass externally from the outside of the heating furnace, in order to obtain a product having an ultrahigh-modulus. The optimum condition for effective processing is determined by the parameters including the drawing speed, the output from the microwave power source and the concentration of polar molecules. The influences of the aforementioned parameters will now be discussed more in detail by referring to the following Examples.

EXAMPLE 4

In this Example, a sample polymer was drawn under dielectric heating while heating the sample externally at a different drawing speed. In other words, the samples made of the same material were drawn while changing the feed speed and the take-up speed. Each sample was the same precursor rod made of the same crystalline polyoxymethylene as used in Example 2 and having a diameter of 1.0 mm, which was drawn in the same dielectric heating apparatus 4 while maintaining the ambient temperature at 147° C. by external heating. The conditions for the experiments and the results obtained thereby are shown in Table 3.

TABLE 3

| Run No. | 5 | 6 | 7 | 8 |
| --- | --- | --- | --- | --- |
| Feed Speed (cm/min) | 4.3 | 8.3 | 14.0 | 29.0 |
| Take-up Speed (m/min) | 1.03 | 1.98 | 2.85 | 4.99 |
| Draw Ratio | 24 | 24 | 20 | 17 |
| Filament Diameter (mmφ) | 0.21 | 0.21 | 0.23 | 0.26 |
| Tensile Modulus (GPa) | 36 | 33 | 30 | 19 |

In each of the experiments included in this Example, the feed speed was set to the constant speed given in Table 3, and the take-up speed is gradually increased as the output from the power source was increased slowly. In this Example where a precursor rod having a diameter of 1.0 mm was used, the take-up speed could be increased until the output from the power source reached the maximum level of 1.5 kW without being suffered by breakage of the rod. As shown in Table 3, the maximum draw ratio was reduced with attendant reduction in tensile modulus of the product as the feed speed is increased. It may be said from the results given above that the feed speed be set to the optimum speed for producing a product having an ultrahigh-modulus.

EXAMPLE 5

In this Example, a sample polymer was drawn under dielectric heating while changing the ambient temperature raised by the external heating. Each sample was the same precursor rod made of the same crystalline polyoxymethylene as used in Example 2 and having a diameter of 2.0 mm, which was drawn in the same dielectric heating apparatus 4 while setting the take-up speed to 2.0 cm/min and the draw ratio was increased by decreasing the feed speed as the output from the power source was gradually increased. After the output from the power source had reached to 0.6 kW, the feed speed was further decreased at that output value to increase the draw ratio until the rod was broken. The conditions for the experiments and the results obtained thereby are shown in Table 4.

TABLE 4

| Run No. | 9 | 10 | 11 | 12 | 13 |
| --- | --- | --- | --- | --- | --- |
| Ambient Temperature (°C.) | 126 | 132 | 135 | 140 | 145 |
| Feed Speed (cm/min.) | 12.5 | 10.7 | 9.8 | 9.1 | 8.8 |
| Draw Ratio | 16 | 19 | 21 | 22 | 23 |
| Filament Diameter (mmφ) | 0.50 | 0.47 | 0.45 | 0.43 | 0.43 |
| Tensile Modulus (GPa) | 21 | 26 | 28 | 24 | 22 |

As will be seen from Table 4, the draw ratio was regularly increased depending on the ambient temperature raise in the heating furnace, but the maximum tensile modulus, i.e. 28 GPa in Run No. 11, was obtained when the ambient temperature is raised to 135° C. by external heating followed by some drop as the ambient temperature was further raised up to 145° C. This is because the entire mass of the processed polymer has been heated approximately uniformly to result in failure of draw stress concentration thus leading to the reduction in tensile modulus of the product, since the crystalline region have been heated intensely as the calorific value of the heat generated in the amorphous regions and defected regions within the crystal by dielectric heating has been increased when the ambient temperature is raised to a temperature of higher than 135° C. It may be said from the results given above that the ambient temperature maintained by the external heating must be set to the optimum temperature for producing a product having an ultrahigh-modulus.

EXAMPLE 6

In this Example, a sample polymer was drawn under dielectric heating while heating the system externally from the outside thereof and changing the output of the microwave power source. Each sample used in this Example was the same precursor rod made of the same crystalline polyoxymethylene as used in Example 2 and having a diameter of 2.0 mm, which was drawn in the same dielectric heating apparatus 4. By means of external heating, the ambient temperature at the vicinity of the inlet of the circular waveguide 7 for dielectric heating was set to 55° C., and the ambient temperature was gradually raised along the drawing direction with a pre-set temperature gradient so that the ambient temperature at the vicinity of the outlet of the circular waveguide 7 was maintained at the highest temperature of 137° C. The feed speed was set to 10 cm/min, and the take-up speed was slowly increased with the increase of the output from the microwave power source 5. After the output from the power source 5 reached the pre-set value, respectively given in the following Table 5, the draw ratio was further increased by increasing the take-up speed at that output until the rod was broken. The conditions for the experiments and the results obtained thereby are shown in Table 5.

TABLE 5

| Run No. | 14 | 15 | 16 | 17 | 18 |
| --- | --- | --- | --- | --- | --- |
| Output of Power Source (kW) | 0.4 | 0.7 | 0.8 | 0.9 | 1.1 |
| Take-up Speed (m/min) | 1.89 | 2.21 | 2.25 | 2.57 | 2.18 |
| Draw Ratio | 18 | 21 | 21 | 24 | 21 |
| Filament Diameter (mmφ) | 0.45 | 0.44 | 0.42 | 0.40 | 0.44 |
| Tensile Modulus (GPa) | 29 | 32 | 33 | 36 | 25 |

As will be understood from the results given above, both of the draw ratio and the tensile modulus were increased as the output from the power source increased until the output took the value of 0.9 (Run No. 17), but they were dropped when the output was further increased to 1.1 kW (Run No. 18). This is because the calorific value of the heat generated in the amorphous region is increased further to heat the crystalline regions by heat conduction to lower the selective heating of the amorphous regions and defect regions within the crystal when the output of the power source becomes excessively large, although the amorphous regions and defect regions within the crystal are heated more intensely by the selective heating by dielectric heating and the crystalline regions are heated only by indirect heat conduction. As a result, the draw ratio and the tensile modulus are dropped when the output from the power source exceeds beyond a certain value. It may be said from the results given above that the output from the power source should be selected within an optimum range for producing a product having an ultrahigh-modulus.

EXAMPLE 7

In this Example, a sample polymer was drawn under dielectric heating while heating the sample externally from the outside thereof and changing the polar molecule concentration contained in the sample polymer. The sample crystalline polymer used was a polyoxymethylene having a density of 1.42 g/cm³, a melting point of 179° C., a number average molecular weight of 58,000 and a weight average molecular weight of 130,000, and nitrobenzene was added as a polar molecule. A precursor rod made of the aforementioned polyoxymethylene and having a diameter of 1.0 mm was immersed in nitrobenzene maintained at 80° C. for a period of from 10 minutes to 2 hours. Each sample polyoxymethylene containing 0.15 to 6.0%, by weight, of nitrobenzene was fed into a dielectric heating apparatus 4 (frequency: 2.45 GHz, maximum output: 1.5 kW, length of circular waveguide: 0.5 m, inner diameter: 95.6 mm) heated from the outside to have an ambient temperature of 147° C. The take-up speed was set to 1 m/min, and the draw ratio was gradually increased by lowering the feed speed as the output from the microwave power source is increased slowly. The conditions for the experiment and the results obtained thereby are shown in Table 6.

TABLE 6

| Run No. | 19 | 20 | 21 | 22 | 23 | 24 |
|---|---|---|---|---|---|---|
| Polar Molecule Concentration (wt %) | 0 | 0.15 | 0.55 | 1.0 | 4.0 | 6.0 |
| Output of Power Source (kW) | 1.5 | 1.5 | 1.5 | 1.5 | 0.9 | 0.7 |
| Feed Speed (cm/min) | 8.1 | 8.0 | 6.3 | 6.2 | 5.2 | 5.6 |
| Take-up Speed (m/min.) | 1.05 | 1.05 | 1.04 | 1.01 | 1.16 | 1.12 |
| Draw Ratio | 13 | 13 | 17 | 16 | 22 | 20 |
| Filament Diameter (mm$\phi$) | 0.29 | 0.28 | 0.26 | 0.25 | 0.21 | 0.23 |
| Tensile Modulus (GPa) | 18 | 20 | 24 | 22 | 16 | 16 |

As will be seen from Table 6, by the addition of 0.55%, by weight, of nitrobenzene to the polyoxymethylene (see Run No. 21) the tensile modulus of the product was increased to 24 GPa which was considerably larger than the tensile modulus (18 GPa) of the product obtained when nitrobenzene was not added (see Run No. 19). Nitrobenzene is a polar molecule and has a dielectric absorption band within the oscillation frequency of the microwave generated by the dielectric heating apparatus 4. The crystalline regions and defect regions within the crystal is not impregnated with nitrobenzene, and the thus added nitrobenzene is selectively concentrated in the amorphous regions and defect regions within the crystal. As a result, the amorphous region containing concentratedly the thus added nitrobenzene tends to be heated more selectively by dielectric heating, so that the draw stress is concentratedly applied to the amorphous regions and defect regions within the crystal to facilitate amorphous orientation resulting in improvement in tensile modulus of the product. When the content of nitrobenzene is increased to a higher level, the calorific value of the heat generated in the amorphous regions and defect regions within the crystal becomes larger with attendant temperature raise in the crystalline regions due to heat conduction. If the content of nitrobenzene exceeds a certain level, the entire mass including the amorphous and crystalline regions is intensely heated to approximate to a uniformly heated condition even when the output of the microwave power source is lowered, whereby the tensile modulus of the product is reduced although the draw ratio is improved further. As will be apparent from the foregoing, content of the added polar molecule should be suitably selected for producing a product having an ultrahigh modulus.

EXAMPLE 8

A precursor tube made of a polyoxymethylene having a number average molecular weight of 37,000, a weight average molecular weight of 83,000, a density of 1.42 g/cm$^3$ and a melting point of 179° C. was drawn under dielectric heating. The outer diameter of the tube was 3.0 mm, and the inner diameter of the tube was 1.0 mm. The used dielectric heating apparatus 4 comprised a microwave power source 5 for generating a microwave having a frequency of 2.45 GHz, the maximum output of the microwave power source 5 being 1.5 kW, a copper made circular waveguide (dielectric heating furnace) 7 for dielectric heating and having a length of 3 meters and an inner diameter of 95.6 mm, and other parts. The ambient temperature in the heating furnace was set to have a temperature gradient changing from 60° C. at the center of the inlet section of the dielectric heating furnace through the sections heated to 90° C., 105° C., 120° C. and 130° C. to the highest ambient temperature of 130° C. at the center of the outlet section of the dielectric heating furnace, by independently controlling six band heaters 13 mounted on the peripheral wall of the circular waveguide 7. The precursor tube 1 was fed from a feed reel 2 by means of a feeder 3 into the dielectric heating apparatus 4 where it was heated, and then passed to a take-up machine 11 to be clamped by the catapillars of the take-up machine 11 from which the drawn product was passed to a take-up reel 12. The feed speed was set to 0.10 m/min (feed speed per unit furnace length: 0.033 min$^{-1}$), and the feed speed was fixed to that speed constantly during the drawing operation. The output from the power source at the initial stage was 0.22 kW (electric field strength: 200 V/cm). A 3-points bending type tensiometer was interposed between the dielectric heating apparatus 4 and the take-up machine 11 to monitor the tension applied on the pipe 1 during the drawing operation. An outer diameter measuring device was disposed between the take-up machine 11 and the take-up reel 12 to monitor the outer diameter of the drawn pipe. The take-up speed was controlled, after the commencement of drawing operation, to adjust the tension to 10 kg. The take-up speed had to be changed greatly at the initial stage to maintain the tension at the aforementioned constant value, since the pipe was drawn to be lengthened significantly at the drawing point (necking point). However, after the drawing point was fixed, the take-up speed could be set to a constant value, and the steady state operation was continued at a take-up speed of 0.8 m/min. under the constant tension of 10 kg. After the outer diameter of the drawn pipe was stabilized to have a constant value, the output of the power source was raised to the final value of 0.57 kW (Electric Field Strength: 320 V/cm). The temperature of the processed material was raised as the output of the power source was increased, whereby the tension was reduced. Whereupon, the take-up speed was increased to maintain the tension at 10 kg, and steady state operation was continued at a take-up speed of 1.2 m/min. After the outer diameter of the drawn pipe was stabilized to have a constant value, the take-up speed was further increased at some extent, whereby the tension applied to the tube was somewhat increased and the outer diameter of the tube became thinner. After the outer diameter of the drawn tube was again stabilized to have a smaller value, the take-up speed was further increased to produce a thinner tube. The aforementioned operation was repeated to increase the take-up speed, and finally the pipe could be drawn at a take-up speed of 1.4 m/min which corresponds to 14 times as high as the feed speed. The tube was broken when the take-up speed was increased beyond the speed ratio thereof to the feed speed of 14. The drawing tension at that time was 11 kg. In case where the output from the microwave power source was set to the final value of 0.57 kW immediately after the initiation of drawing operation, the calorific value of the heat generated by dielectric heating became excessively large nevertheless the drawing point had not yet been stabilized to cause melting break due to runaway heating. On the other hand, in case where the take-up speed was set to the final take-up speed of 1.4 m/min immediately after the initiation of drawing operation, the strain rate became excessively large to cause breakage of the tube. As will be understood from the foregoing that the output from the microwave power source and the take-up speed should be set to lower levels at the initial stage for drawing the tube under dielectric heating, and that the output and the take-up speed must be gradually raised after the drawing point is fixed to continue the stabilized operation. The outer diameter of the resultant drawn tube was 0.81 mm, and the tensile modulus thereof at the room temperature was 28.5 GPa. The conditions under which the polyoxymethylene tube was drawn under dielectric heating are shown in Table 7. (No. 11)

respectively, set to 105° C., 115° C., 130° C. and 140° C. (see Table 7 No. 12) and the highest ambient temperature at the center of the outlet being set to 140° C. Similar to Example 8, the feed speed was set to 0.10 m/min (feed speed per unit furnace length: 0.033 min.$^{-1}$), and the output from the microwave power source at the initial stage of drawing operation was set to 0.22 kW (electric field strength: 200 V/cm). In consideration of the operational condition where the ambient temperature was raised by 10° C., the take-up speed was controlled to apply a tension of 9 kg to the tube at the initial stage of drawing operation. After the drawing point was fixed and the outer diameter of the drawn tube was stabilized to have a constant value, the output of the power source was gradually raised, similar to Example 8, to the final value of 0.57 kW and concurrently the take-up speed was raised so that the constant tension of 9 kg was applied to the tube. The take-up speed was raised repeatedly after the outer diameter of the drawn tube took a stable value at every operation. Finally, the tube could be drawn at a take-up speed of 2.0 m/min and at a speed ratio of take-up speed to the feed speed of 20 times. The tube was broken when the take-up speed was further increased beyond aforementioned value. The drawing tension at that was 11.5 kg. The resultant drawn tube had an outer diameter of 0.67 mm and a tensile modulus of 44.8 GPa. According to this Example, the tensile modulus (44.8 GPa) was improved over

TABLE 7

Conditions for Drawing Polyoxymethylene Pipe under Dielectric Heating

Polyoxymethylene Used: POM 5010
Outer Diameter of tube: 3 mm, Inner Diameter of tube: 1 mm
Length of Heating Furnace: 3 m

| No. | Ambient Temperature (°C.) (Inlet) | | | Ambient Temperature (°C.) (Outlet) | | | Field Strength (V/cm) | Feed Speed (m/min) | Take-up Speed (m/min) | Speed Ratio | Strain Rate (min$^{-1}$) | Tensile Modulus (GPa) |
|---|---|---|---|---|---|---|---|---|---|---|---|---|
| | 1 | 2 | 3 | 4 | 5 | 6 | | | | | | |
| 1 | 85 | 130 | 130 | 130 | 135 | 140 | 290 | 0.50 | 7.8 | 15.5 | 2.43 | 24.4 |
| 2 | 85 | 85 | 105 | 135 | 135 | 140 | 360 | " | 7.5 | 15.0 | 2.33 | 28.2 |
| 3 | 60 | 120 | 125 | 140 | 145 | 150 | " | " | 10.0 | 20.0 | 3.17 | 35.4 |
| 4 | 50 | 100 | 135 | 150 | 155 | 160 | " | " | 10.0 | 20.0 | 3.17 | 28.8 |
| 5 | 40 | 60 | 90 | 125 | 135 | 140 | 410 | " | 8.3 | 16.5 | 2.60 | 26.5 |
| 6 | 40 | 70 | 120 | 130 | 130 | 130 | 360 | 0.20 | 2.8 | 14.0 | 0.87 | 26.4 |
| 7 | 50 | 90 | 130 | 140 | 140 | 140 | " | " | 4.05 | 20.0 | 1.28 | 37.4 |
| 8 | 40 | 80 | 130 | 140 | 140 | 150 | " | " | 4.75 | 23.8 | 1.52 | 36.0 |
| 9 | 70 | 105 | 115 | 130 | 140 | 140 | 250 | 0.10 | 1.7 | 17.0 | 0.53 | 33.3 |
| 10 | 115 | 120 | 125 | 135 | 140 | 140 | 290 | " | 1.6 | 16.0 | 0.50 | 36.6 |
| 11 | 60 | 90 | 105 | 120 | 130 | 130 | 320 | " | 1.4 | 14.0 | 0.43 | 28.5 |
| 12 | 70 | 105 | 115 | 130 | 140 | 140 | " | " | 2.0 | 20.0 | 0.63 | 44.8 |
| 13 | 80 | 110 | 125 | 135 | 145 | 145 | " | " | 2.3 | 23.0 | 0.73 | 42.1 |
| 14 | 80 | 105 | 115 | 130 | 140 | 143 | 340 | " | 2.2 | 22.0 | 0.70 | 45.1 |
| 15 | 40 | 60 | 110 | 140 | 140 | 140 | 360 | " | 2.6 | 26.0 | 0.83 | 48.4 |
| 16 | 65 | 105 | 125 | 135 | 145 | 145 | " | " | 2.4 | 24.0 | 0.77 | 46.2 |
| 17 | 40 | 65 | 90 | 115 | 130 | 140 | 290 | 0.051 | 1.20 | 23.5 | 0.38 | 53.6 |
| 18 | 35 | 60 | 85 | 110 | 125 | 135 | 360 | " | 1.17 | 23.0 | 0.37 | 52.0 |
| 19 | 40 | 65 | 90 | 115 | 130 | 140 | " | " | 1.41 | 27.1 | 0.45 | 59.6 |
| 20 | " | " | " | " | " | " | 410 | " | 1.50 | 29.4 | 0.48 | 59.0 |
| 21 | " | " | " | " | " | " | 470 | " | 1.51 | 29.6 | 0.49 | 57.9 |
| 22 | " | " | " | " | " | " | 500 | " | 1.28 | 25.2 | 0.41 | 47.0 |
| 23 | 35 | 60 | 85 | 110 | 125 | 135 | 360 | 0.023 | 0.70 | 30.2 | 0.23 | 63.1 |

EXAMPLE 9

The same polyoxymethylene tube as used in Example 8 was drawn in the same dielectric heating furnace as used in Example 8, while setting the ambient temperature in the heating furnace to a temperature of higher than the ambient temperature in Example 8 by 10° C. throughout all sections, more specifically the ambient temperature at the center of the inlet of the furnace being 70° C., the ambient temperature in the subsequent sections arranged successively toward the outlet being, that obtained by Example 8 (28.5 GPa) by raising the highest ambient temperature by 10° C., namely from 130° C. to 140° C.

EXAMPLE 10

The same polyoxymethylene tube as used in Example 8 was drawn in the same dielectric heating furnace as used in Example 8, while setting the highest ambient temperature in the heating furnace further higher than the highest ambient temperature as set in Example 9 by additional 5° C. throughout all sections, more specifically the ambient temperature at the inlet of the furnace being 80° C., the ambient temperatures in the sections arranged successively toward the outlet of the furnace being, respectively, set to 110° C., 125° C., 135° C. and 145° C., and the highest ambient temperature at the outlet of the furnace being set to 145° C. (see Table 7 No. 13). Similar to Example 8, the feed speed was set to 0.10 m/min., and the output from the microwave power source at the initial stage of drawing operation was set to 0.22 kW. The take-up speed was controlled to apply a tension of 9 kg to the tube at the initial stage of drawing operation. After the drawing point was fixed and the outer diameter of the drawn tube was stabilized to have a constant value, the output of the power source was gradually raised, similar to Example 8, to the final value of 0.57 kW and concurrently the take-up speed was raised so that the constant tension of 9 kg was applied to the tube. The take-up speed was raised repeatedly after the outer diameter of the drawn tube took a constant value. Finally, the tube could be drawn at a take-up speed of 2.3 m/min and at a speed ratio of 23 times. The tube was broken when the take-up speed was further increased beyond the aforementioned value. The drawing tension at that time was 10.5 kg. The resultant tube had an outer diameter of 0.65 mm and a tensile modulus of 42.1 GPa. Although the speed ratio could be raised from 20 times (Example 9) to 23 times by raising the highest ambient temperature from 140° C. (Example 9) to 145° C., the tensile modulus of the product was rather lowered from 44.8 GPa (Example 9) to 42.1 GPa. It is considered that the temperature of the entire mass of the sample polymer was raised too higher to render the mass partially to be in flow drawing state, leading to reduction in tensile modulus of the product, since the highest ambient temperature in this Example was too high.

EXAMPLE 11

The same polyoxymethylene tube as used in Example 8 was drawn under dielectric heating in the same dielectric heating furnace as used in Example 8, while setting the ambient temperature in the heating furnace to the same temperature as in Example 9, namely the ambient temperature at the inlet of the furnace being set to 70° C., the ambient temperatures in the sections arranged successively toward the outlet of the furnace being, respectively, set to 105° C., 115° C., 130° C. and 140° C., and the highest ambient temperature at the outlet of the furnace being set to 140° C. (see Table No. 9). The pipe was drawn under dielectric heating while changing the final value of the output from the microwave power source to 0.34 kW (electric field strength: 250 V/cm). Similar to Example 8, the feed speed was set to 0.10 m/min, and the output from the microwave power source at the initial stage of drawing operation was set to 0.22 kW. The take-up speed was controlled so that a tension of 10 kg was applied to the pipe at initial stage of drawing operation. After the drawing point was fixed and the outer diameter of the drawn pipe was stabilized to have a constant value, the output was gradually raised to the final value of 0.34 kW and the take-up speed was increased correspondingly to maintain the tension at 10 kg. The take-up speed was further increased, after the outer diameter of the drawn pipe took a constant value. The last-mentioned operation was repeated. Finally, the pipe could be drawn at a take-up speed of 1.7 m/min and at a speed ratio of 17 times, but it was broken when the take-up speed was increased beyond the aforementioned speed. The drawing tension at that time was 12 kg. By depressing the output from 0.57 kW (Example 9) to 0.34 kW, the speed ratio was decreased from 20 times (Example 9) to 17 times and the tensile modulus of the product was decreased from 44.8 (Example 9) to 33.3 GPa.

EXAMPLE 12

The same polyoxymethylene tube as used in Example 8 was drawn under dielectric heating in the same dielectric heating furnace as used in Example 8, while settting the feed speed to 0.50 m/min (Feed Speed per Unit Furnace Length: 0.17 min$^{-1}$) and setting the ambient temperature in the dielectric heating furnace at 60° C., 120° C., 125° C., 140° C., 145° C. and 150° C. in respective sections arranged from the inlet to the outlet of the furnace in that order. Thus, the highest ambient temperature at the outlet of the furnace was 150° C. The output from the microwave power source at the initial stage of drawing operation was set to 0.22 kW similar to Example 8, and the take-up speed was controlled so that a tension of 7 kg was applied to the tube at the initial stage. After the drawing point was fixed and the outer diameter of the tube was stabilized to have a constant value, the output was increased up to the final value of 0.70 kW (electric field strength: 360 V/cm) and concurrently the take-up speed was increased. Finally, the tube could be drawn at a take-up speed of 10 m/min and at a speed ratio of 20 times. However, the tube was broken when the take-up speed was increased beyond the aforementioned speed. The resultant tube had an outer diameter of 0.67 mm and a tensile modulus of 35.4 GPa.

EXAMPLE 13

The same polyoxymethylene tube as used in Example 8 was drawn under dielectric heating in the same dielectric heating furnace as used in Example 8, while setting the feed speed to 0.023 m/min (feed speed per unit furnace length: 0.008 min.$^{-1}$) and setting the ambient temperature in the dielectric heating furnace at 35° C., 60° C., 85° C., 110° C., 125° C. and 135° C. in respective sections arranged from the inlet to the outlet of the furnace in that order (see Table 7 No. 23). Thus, the highest ambient temperature at the outlet of the furnace was 135° C. In this Example, no tensiometer was provided. The drawing operation was commenced while setting the output from the microwave power source to 0.07 kW (electric field strength: 110 V/cm) and the take-up speed to 0.14 (speed ratio: 6 times). After the outer diameter of the drawn tube was stabilized to have a constant value, the take-up speed was increased at some extent while maintaining the output at the fixed value of 0.07 kW. Whereupon, the outer diameter of the drawn tube became slenderer correspondingly. After the output diameter of the drawn tube was stabilized again, the take-up speed was increased further. The aforementioned operation was repeated to increase the take-up speed to 0.44 m/min thereby to raise the speed ratio to 19 times. Then, the output from the microwave power source was gradually raised up to the final value of 0.70 kW (Electric Field Strength: 360 V/cm) while maintaining the take-up speed at the fixed speed of 0.44 m/min. Thereafter, the take-up speed was increased stepwisely. Finally, the tube could be drawn at a take-up speed of 0.70 m/min and at a speed ratio of 30 times. However, the tube was broken when the take-up speed was increased to 0.72 m/min. The resultant drawn tube had an outer diameter of 0.60 mm and a tensile modulus of 63.1 GPa.

EXAMPLE 14

A rod made of the polyoxymethylene described in Example 8 and having a diameter of 2.4 mm was drawn under dielectric heating. The used dielectric heating apparatus was the same as used in Example 8. The feed speed was set to 0.056 m/min (feed speed per unit furnace length: 0.019 min.$^{-1}$). Similar to Example 13, the ambient temperature in the dielectric heating furnace was set at 35° C., 60° C., 85° C., 110° C., 125° C. and 135° C. in respective sections arranged serially from the inlet to the outlet of the furnace in that order. Thus, the highest ambient temperature at the outlet of the furnace was 135° C. Similar to Example 13, no tensiometer was provided. The drawing operation was commenced while setting the output from the microwave power source to 0.07 kW (Electric Field Strength: 110 V/cm) and the take-up speed to 0.34 (speed ratio: 6 times). After the diameter of the drawn tube was stabilized to have a constant value, the take-up speed was increased at some extent while maintaining the output at the fixed value of 0.07 kW. After a while, the diameter of the drawn tube was stabilized again at the thus increased take-up speed. Then the take-up speed was increased again at some extent. The aforementioned operation sequence was repeated to increase the take-up speed to 0.90 m/min thereby to raise the speed ratio to 16 times. Thereafter, the output from the microwave power source was gradually raised up to the final value of 0.70 kW (electric filled strength: 360 V/cm) while maintaining the take-up speed at the fixed speed of 0.90 m/min. Then, the take-up speed was increased stepwise. Finally, the rod could be drawn at a take-up speed of 1.56 m/min and at a speed ratio of 28 times. However, the rod was broken when the take-up speed was increased to 1.60 m/min. The resultant drawn rod had a diameter of 0.48 mm and a tensile modulus of 56.0 GPa.

As has been described in detail hereinbefore, according to this invention, a pipe or rod made of polyoxymethylene or another crystalline polymer is drawn under dielectric heating while maintaining the ambient temperature at an elevated temperature by external heating and while setting the feed speed and the speed ratio of the feed speed to the take-up speed to defined speed and ratio, whereby a pipe or rod product having an ultrahigh-modulus, such as a tensile modulus of higher than 25 GPa, which is superior to the value obtainable by any of the conventional techniques can be continuously produced at a relatively high production speed.

A product in the form of filament, rod, pipe or tape produced by the process of this invention may be used for various applications. For instance, a filament produced in accordance with this invention may be used as a reinforcing material or filler in a variety of composite materials. Materials produced by the process of this invention may be used for various applications wherein light weight, small linear expansion coefficient and high tensile modulus are required. It is particularly advantageous to use the product of this invention as a coating material for optical fibers or as a reinforcing material for various applications where it is required that the shrinkage due to temperature drop is as small as possible.

What is claimed is:

1. A process for producing an ultrahigh-modulus polymer comprising:
   drawing a crystalline polymer continuously under dielectric heating while maintaining the ambient temperature at an elevated temperature by external heating, said ambient temperature being controlled to change from a lower temperature to a higher temperature along the drawing direction of said crystalline polymer with a pre-set temperature gradient,
   wherein said crystalline polymer is a polyoxymethylene having an average molecular weight of from 42,000 to 32,000.

2. A process for producing an ultrahigh-modulus polymer comprising:
   drawing a crystalline polymer continuously under dielectric heating while maintaining the ambient temperature at an elevated temperature by external heating, said ambient temperature being controlled to change from a lower temperature to a higher temperature along the drawing direction of said crystalline polymer with a pre-set temperature gradient,
   wherein said crystalline polymer is a polyoxymethylene and forms a precursor rod, said precursor rod being immersed in nitrobenzene at 80° C. for a period of from 10 minutes to 2 hours prior to drawing to contain 0.15 to 6.0%, by weight, of nitrobenzene.

3. A process according to claims 1 or 2, wherein said crystalline polymer forms a rod or tube.

4. A process according to claims 1 or 2, wherein the drawing speed is varied during the continuous drawing step to draw the polymer at a draw ratio ranging within 30 to 14 while maintaining the highest ambient temperature at the outlet of from 130° to 150° C. and maintaining the output for dielectric heating of from 0.23 to 1.5 kW.

5. A process according to claims 1 or 2, wherein said crystalline polymer is drawn in a furnace in which the ambient temperature is gradually changed by external heating with the temperature at the vicinity of the inlet of said furnace of about 35° C. and with the highest ambient temperature at the vicinity of the outlet of said furnace of about 135° C.

6. A process for producing an ultrahigh-modulus polymer wherein a rod or tube of polyoxymethylene is drawn under dielectric heating, comprising the step of continuously drawing said rod or tube at a highest ambient temperature ranging within 120° to 170° C. at a feed speed per furnace length of not more than 0.3 min.$^{-1}$ while maintaining the product of the oscillation frequency and the square of the electric field strength within a range of from $9.8 \times 10^{13}$ to $7.4 \times 10^{14}$ Hz·V$^2$/cm$^2$ and maintaining the ratio of the take-up speed to feed speed at a ratio of not less than 12 times.

* * * * *